United States Patent [19]

Young et al.

[11] Patent Number: 4,948,517
[45] Date of Patent: Aug. 14, 1990

[54] SYSTEM FOR PREVENTING OIL DROPLET SIZE REDUCTION

[75] Inventors: Grant A. Young, Tulsa; William D. Wakley, Broken Arrow, both of Okla.

[73] Assignee: Amoco Corporation, Chicago, Ill.

[21] Appl. No.: 326,350

[22] Filed: Mar. 21, 1989

[51] Int. Cl.$^5$ ............................................ B01D 17/038
[52] U.S. Cl. ................................. 210/767; 210/512.1; 210/512.2; 418/1; 418/48; 418/181
[58] Field of Search ................... 137/571; 175/107, 42; 209/211; 210/137, 416.1, 416.4, 416.5, 418, 512.1, 512.2, 512.3, 787, 788, 767; 418/48, 1, 181; 310/52, 112; 55/1, 199

[56] References Cited

U.S. PATENT DOCUMENTS

| | | | |
|---|---|---|---|
| 3,559,811 | 2/1971 | Dahlberg | 209/211 |
| 3,975,121 | 8/1976 | Tschirky | 418/48 |
| 4,116,790 | 9/1978 | Prestridge | 210/512.1 |
| 4,216,796 | 8/1980 | Gastrock | 137/571 |
| 4,219,409 | 8/1980 | Liller | 210/512.1 |
| 4,622,150 | 11/1986 | Carroll | 210/788 |
| 4,635,735 | 1/1987 | Crownover | 175/42 |
| 4,698,152 | 10/1987 | Carroll | 210/512.2 |
| 4,719,014 | 1/1988 | Carroll | 209/211 |
| 4,773,834 | 9/1988 | Saruwatari | 418/48 |
| 4,844,812 | 7/1989 | Haynes et al. | 210/512.1 |
| 4,844,817 | 7/1989 | Flanigan et al. | 210/788 |

FOREIGN PATENT DOCUMENTS 1328511  4/1962  France .................................. 210/787

Primary Examiner—Frank Spear
Assistant Examiner—Joseph Drodge
Attorney, Agent, or Firm—Scott H. Brown; Fred E. Hook

[57] ABSTRACT

A system is disclosed for preventing oil droplet size reduction when introducing an oil/water stream into an oil-from-water separation unit. The system includes a conduit extending from a source of the oil/water stream to an inlet of the oil-from-water separation unit, which can be one or more hydrocyclone separators, centrifuges, settling tanks and the like. A throttling device is operatively connected to the conduit for regulating the quantity of the oil/water stream passing therethrough. The throttling device eliminates the shearing of the fluid, thereby preventing oil droplet size reduction. The throttling device can include a progressive cavity motor with a rotation control mechanism connected to the rotor of the motor to control the rpm of the rotor, and thus the quantity and pressure of the fluid passing therethrough.

6 Claims, 3 Drawing Sheets

SYSTEM FOR PREVENTING OIL DROPLET SIZE REDUCTION

BACKGROUND OF THE INVENTION

1. Field of the Invention

The present invention relates to oil-from water separators and, more particularly, to systems for preventing oil droplet size reduction when introducing an oil/water stream into an oil-from-water separator.

2. Setting of the Invention

In the production of hydrocarbons from subterranean formations, often times large volumes of water are obtained with the produced oil and gas. Initial processing removes most of the oil and gas from the water; however, significant quantities of oil will still be present in the water. Due to stringent environmental requirements, the oil remaining within the water needs to be separated and removed so that a maximum concentration of oil will be about 48 mg/liter. To meet these stringent environmental requirements, improved hydrocyclone separators and other oil-from-water separation devices are being developed.

Usually, the produced oil/water stream passes into a primary water knockout wherein gas is removed and a major portion of the oil is removed. Thereafter, the oily water passes through a metering or dump valve which limits the quantity of the oil/water stream that is passed to an oil-from-water separation unit. The separation unit usually includes a plurality of hydrocyclone separators, centrifuges, settling tanks or combinations of these.

It has been found that the oil removal efficiency of these separation units is dependent upon the size of oil droplets entering the separation unit. The larger the oil droplet size, the greater the ease of the removal of the oil from the water; conversely, the smaller the oil droplet size, the greater the difficulty in removing the oil from the water. Further, it has been found that the oil droplets are sheared and thus reduced in size when passing through the typical metering valve or dump valve. This phenomenon is described in SPE Paper 18204. "Droplet Size Analysis: A New Tool for Improving Oil Field Separations," by Flanigan et al. published October 1988.

In order to improve the separation efficiency of oil-from-water separation units, there is a need for a system for preventing oil droplet size reduction when introducing an oil/water stream into an oil-from-water separation unit.

SUMMARY OF THE INVENTION

The present invention has been contemplated to overcome the foregoing deficiencies and meet the above-described needs. The present invention comprises a system for preventing oil droplet size reduction when introducing an oil/water stream into an oil-from-water separation unit. Generally, the system includes a conduit that extends from a source of the oil/water stream into an inlet of an oil-from-water separation unit, which can comprise one or more hydrocyclone separators, centrifuges, settling tanks or combinations of these. In place of the usual metering or dump valve on the conduit, a throttling device is utilized for regulating the quantity and pressure of the oil/water stream that passes therethrough. The throttling device maintains the oil-droplet stream by eliminating high shear rates and thereby maintains the initial oil droplet size distribution.

DETAILED DESCRIPTION OF THE PREFERRED EMBODIMENTS

Figure 1:
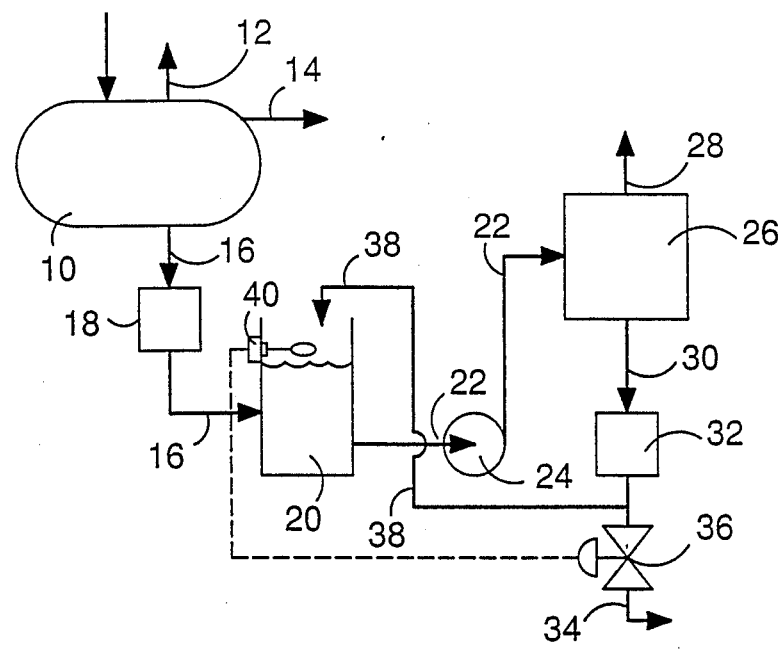
FIG. 1 is a diagrammatic representation of an oil-from-water separation system used in accordance with the present invention.

A novel system is disclosed for preventing oil droplet size reduction when an oil/water stream is introduced into an oil-from-water separation unit. The system can be included into an existing or formed as part of a commercially-available oil-from-water separation system, such as the type used in oil field applications. As shown in FIG. 1, an oil/water stream is introduced into a tank or vessel 10, commonly referred to as a "free water knockout" wherein gas is removed through a conduit 12 to a flare, or sale, and a primary portion of the oil is removed through a conduit 14 for further treatment or storage as is desired. The tank 10 can be a settling tank, with or without spiral internal flow, and any other commercially-available primary separation tank or vessel as is desired.

The oily water exiting the vessel 10 passes through a conduit 16 and a flow regulating and throttling device, in accordance with the present invention. In the prior systems, the throttling device would be a dump or throttling valve; however, as discussed previously, such valves are not desired for use in the present system because of their inherent shearing forces that undesirably reduce the oil droplet size. The oily water is then passed into an accumulation tank 20, which is for surge prevention and regulates the feed of oily water being passed through a conduit 22 into a pump 24. It has been found that in most oil field applications a fixed rate pump is preferred to maintain the proper inlet pressure and fluid flow introduction of the oily water into an oil-from-water separation unit 26. Further, to prevent oil droplet size reduction, it is preferred that the pump 24 be a progressive cavity pump or other type of nonshearing pump, as described in SPE Paper 18204, supra.

As discussed previously, the type of oil-from-water separation unit 26 utilized within the system of the present invention is not critical to the improvements in oil separation efficiency because all types of oil separation devices benefit from having larger oil droplet sizes to remove. The oil-from-water separation unit 26 can comprise one or more hydrocyclone separators, one or more centrifuges, one or more settling tanks, or combinations of these, as is well known to those skilled in the art. Separated oil from the separation unit 26 is passed out through a conduit 28 for storage or further treatment as is desired. Separated water from the separation unit 26 passes through a conduit 30 and through a backpressure regulating device 32, which will be described in more detail below, and outward through a conduit 34 for discharge or treatment. A valve 36 can be connected to the conduit 34 to regulate the quantity of separated water that is forced back through a recycle conduit 38 into the accumulator tank 20. This recycle capability can be provided to ensure that a sufficient quantity of water is within the tank 20 for introduction into the oil-from-water separation unit 26. The valve 36 can be controlled by a remote level controller 40 located on the tank 20. Further, an oil sensor (not shown) can be utilized to ensure that no more than a predescribed quantity of oil is permitted to pass through the conduit 34 to be discharged.

With the increasing environmental restrictions that less oil be allowed to be discharged, advances must be made to increase oil-from-water separation unit efficiency. One of the primary benefits of the use of the present invention is that the throttling device 18 permits the flow of oily water therethrough without being subjected to high shear rates. Again, high shear rates have been found to cause undesired oil droplet size reduction as described fully in SPE 18204, supra. To illustrate how the reduction in oil droplet size negatively effects the separation efficiency of hydrocyclone separators, as the type used within the separation unit 26, the following example is provided. A hydrocyclone separator was commercially obtained, having the following dimensions: diameter of the upper cylindrical portion (Dc)=2.75", ratio of inlet diameter to diameter of upper cylindrical portion (di/Dc)=2.26", ratio of overflow diameter to diameter of upper cylindrical portion (do/Dc)=0.028, ratio of length of upper cylindrical portion to diameter thereof (Lc/Dc)=1, cone angle of conical portion ($\alpha$)=20°, core angle of lower conical portion ($\beta$)=1.5°, diameter of underflow (du)=1.0", and ratio of straight tail portion to diameter of the upper cylindrical portion (Ls/Dc)=13. A water stream at 32 gpm and 60° F. was passed through the hydrocyclone separator with 1000 mg/liter of two different types of crude oils, the first being Bumpass crude having an sg=0.86 gm/cc viscosity and South China Sea crude having an sg=0.95 gm/cc viscosity. Using a homogenizer, the oil droplet size of the crude oils were varied from about 20 to about 60 microns. The separation efficiency (%) is defined as EFF=(mf cf−$m_w c_w$)/mfcf, wherein mf=mass flow rate of feed,
$m_w$=mass flow rate of separated water,
cf=concentration of oil in feed (mg/liter), and
$c_w$=concentration of oil in separated water (mg/liter).
The efficiency is measured by solvent extraction/IR measurements.

Figure 2:
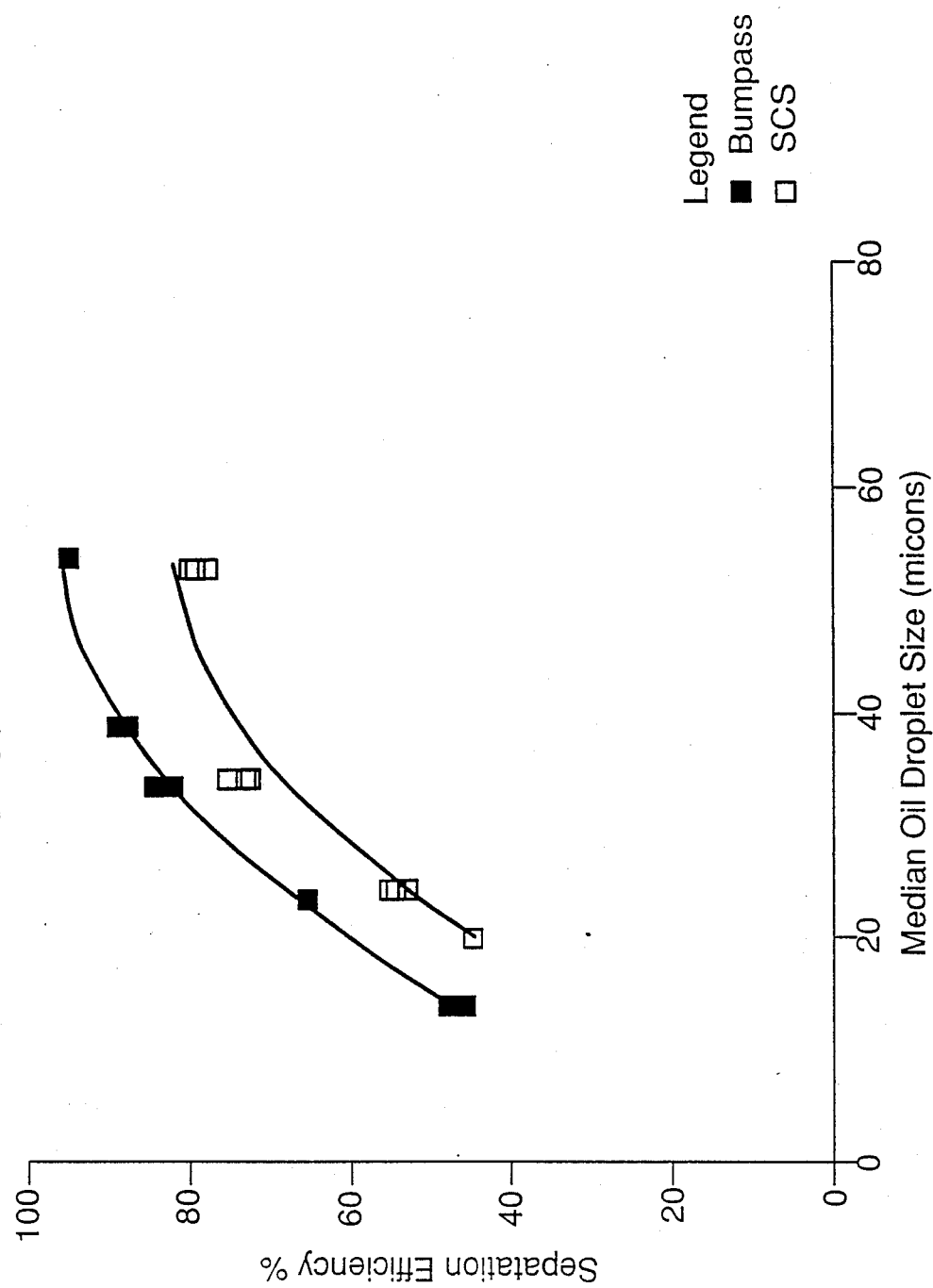
FIG. 2 is a graphical representation of decrease in oil separation efficiency corresponding to a decrease in oil droplet size in the feedstream of a hydrocyclone separator.

FIG. 2 shows the dramatic decrease in separation efficiency with a reduction in oil droplet size. In one case, the separation efficiency went from about 97% to about 45% with only about a 40 micron oil droplet size reduction. Clearly, a 45% separation efficiency cannot meet the current environmental restrictions so efforts need to be made at maintaining or increasing the oil droplet size prior to introduction into the oil-from-water separation unit 26.

Figure 3:
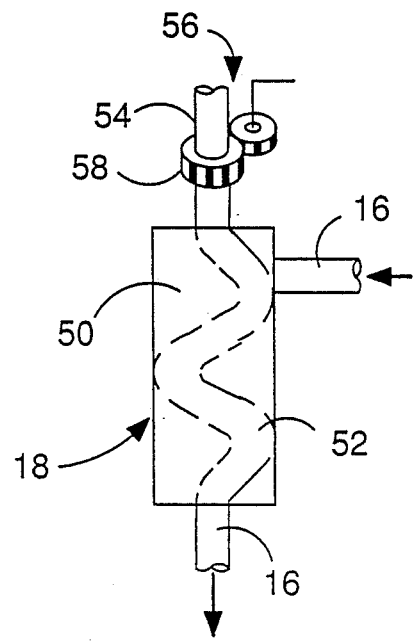
FIG. 3 is an elevational view of a throttling device that prevents oil droplet size reduction in accordance with the present invention and which can be utilized within the system illustrated in FIG. 1.

The inventors have found that if a specific type of throttling device 18 was utilized in place of all throttling or dump valves upstream of the separation unit 26, then the separation efficiency can be increased. One embodiment of the regulating device 18 which eliminates shearing of the oil droplets is shown in FIG. 3. A nonshearing motor, such as a progressive cavity motor 50, is shown with its helical bar rotor 52 shown in dotted lines therein. The rotor 52 rotates within the housing of motor 50 in such a way as to move fluid from high pressure to low pressure. The flow rate is regulated by controlling the rate of rotation of an external shaft 54 of the rotor 52.

If the rotation of the shaft 54 is stopped, then no fluid entering the conduit 16 is allowed to pass therethrough; thus, the motor 50 acts as a valve to prevent fluid flow therethrough. A brake device, generally shown by reference number 56,, is included to prevent the rotation of the shaft 54, as well as to regulate the speed (rpm) of its rotation. Such brake device 56 can be a hydraulic, electrical, pneumatic, fluidic or other device to prevent or regulate the rotation of the shaft 54. In one embodiment, a gear drive 58 is connected to the shaft 54 and in turn rotates a dynamic brake or a slipping plate-type mechanism, as are well known in the art. Further, the gear drive 58 can be connected to a hydraulic, pneumatic or electrical generator to create power for use elsewhere.

In the operation of the present invention, when the flow of the oily water is desired to pass through the conduit 16 and through the throttling device 18, the brake mechanism 56 is released, causing the rotor 52, as well as the shaft 54 to rotate. The desired quantity and pressure of the oily water passing through the conduit 16 is regulated by the operation of the brake mechanism 56. Nowhere is there any disclosure or suggestion within SPE Paper 18204 of utilizing a nonshearing, regulating device, such as a progressive cavity motor, in place of a throttling or dump valve within a oil-from-water separation system, and more specifically, there is no disclosure or suggestion of utilizing a progressive cavity motor without power or with a brake thereon specifically to reduce shear forces therein to prevent the oil droplet size reduction when introducing an oil/water stream into an oil-from-water separation unit.

Figure 4:
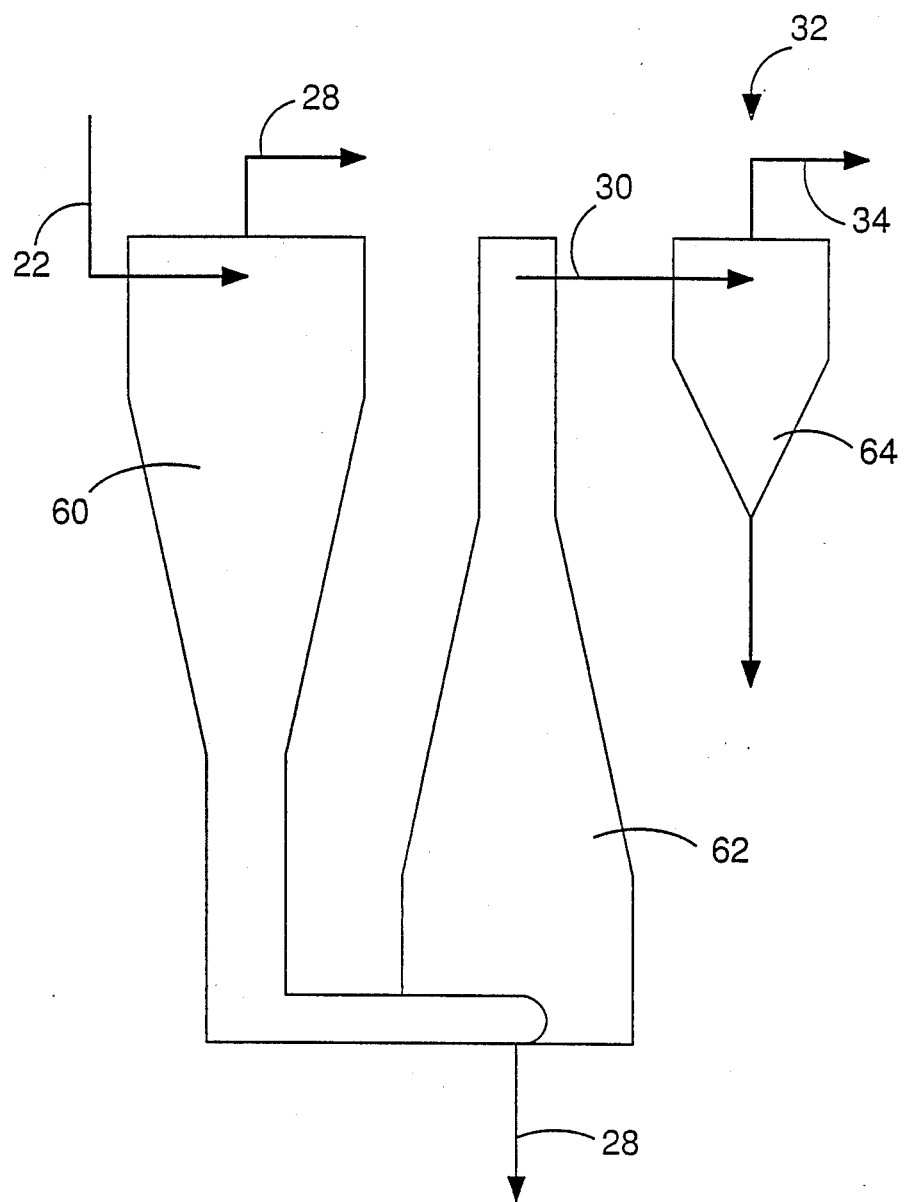
FIG. 4 is a diagrammatic representation of a pair of hydrocyclone separators with a backpressure control device in accordance with the present invention.

FIG. 4 shows one embodiment of an oil-from-water unit 26 that can be utilized in accordance with the present invention. As shown in FIG. 4, the conduit 22 passes an oil/water stream into a first hydrocyclone separator 60 which in turn is connected in series to a second hydrocyclone separator 62. The individual hydrocyclone separators 60 and 62 can be of any commercially-available or well known type.

In order to have proper separation efficiency within a hydrocyclone separation unit of the type illustrated in FIG. 4, it is desired to include some form of flow restriction and backpressure control device 32 downstream thereof to ensure that there is proper backpressure within the system. Usually, the backpressure control system 32 is a throttling valve. The inventors hereof have found that instead of utilizing a throttling valve, the backpressure control device 32 comprises a hydrocyclone separator 64, which provides additional benefits as described herein. If a throttling valve is used as the backpressure control device 32, no additional benefit is made other than merely having control of the backpressure. In fact, in operation a throttling valve often produces an undesired, fluctuating backpressure. But, a hydrocyclone separator 64 by its operation and proper sizing, can provide smooth and proper backpressure control for the separation unit 26 and provide the additional benefit of removing fine solids from the discharged water before it is passed into further treatment or discharge. To those skilled in the art, it is well known that the proper sizing and configuration of a solids hydrocyclone separator 64, is markedly different than that for an oil-from-water hydrocyclone separator, because of the needed internal diameters, angles, inlet sizes, overflow sizes and underflow sizes.

Wherein the present invention has been described in particular relation to the drawings attached hereto, it should be understood that other and further modifications, apart from those shown or suggested herein, may be made within the scope and spirit of the present invention.

What is claimed is:

1. A system for regulating the quantity of a fluid mixture passed into a separate unit in a manner to prevent the size reduction of droplets of a first fluid component of the fluid mixture, comprising:
    at least one separator means for separating the fluid mixture into at least two separate fluid components having differing densities, the separator means including an inlet, an overflow outlet, and an underflow outlet;
    a conduit in communication with a source of the fluid mixture and the inlet of the separator means;
    a progressive cavity motor operatively connected to the conduit; and
    brake means mechanically connected to a rotor of the progressive cavity motor, for regulating the flow of the fluid mixture through the progressive cavity motor in a manner to prevent the size reduction of droplets of the first fluid component prior to introduction into the separator means.

2. The system of claim 1 wherein the at least one separator means comprises at least one hydrocyclone separator.

3. The system of claim 2 and including a back-pressure control device on an underflow conduit extending from the underflow outlet of the at least one hydrocyclone separator.

4. The system of claim 3 wherein the back-pressure control device comprises a secondary hydrocyclone separator.

5. A method of regulating the quantity of a fluid mixture passed into a separation unit in a manner to prevent the size reduction of droplets of a first fluid component of the fluid mixture, comprising:
    (a) passing a fluid mixture from a source of the fluid mixture through a progressive cavity motor;
    (b) regulating the rotation of a rotor of the progressive cavity motor by operating a brake, mechanically connected to the rotor, to regulate the flow of the fluid mixture through the progressive cavity motor in a manner to prevent the size reduction of droplets of the first fluid component; and
    (c) passing the fluid mixture from the progressive cavity motor into a separation unit.

6. The method of claim 5 wherein the separation unit comprises one or more hydrocyclone separators.

* * * * *